United States Patent [19]

Brihier

[11] 4,339,709
[45] Jul. 13, 1982

[54] DEVICE FOR MEASURING THE RELATIVE POSITION OF TWO OBJECTS

[75] Inventor: Gerard C. C. Brihier, Ollainville, France

[73] Assignee: Facom, Morangis, France

[21] Appl. No.: 136,766

[22] Filed: Apr. 3, 1980

[30] Foreign Application Priority Data

Apr. 9, 1979 [FR] France .............................. 79 08919

[51] Int. Cl.³ .......................................... G01R 27/26
[52] U.S. Cl. ................................................. 324/61 R
[58] Field of Search .............. 324/61 R; 33/336, 312, 33/366

[56] References Cited

U.S. PATENT DOCUMENTS

| 2,711,590 | 6/1955 | Wilcox | 33/366 |
|---|---|---|---|
| 2,936,411 | 5/1960 | Doty | 33/366 X |
| 3,146,394 | 8/1964 | Frisch | 324/61 R X |
| 3,206,151 | 9/1965 | Lillestrand | 33/366 X |
| 3,398,362 | 8/1968 | Alais | 324/61 R |
| 3,845,377 | 10/1974 | Shimotori | 324/61 R X |
| 3,857,092 | 12/1974 | Meyer | 324/61 R |
| 3,873,916 | 3/1975 | Sterki | 324/61 R |
| 3,961,318 | 6/1976 | Farrand et al. | 324/61 R X |
| 4,011,500 | 3/1977 | Pelletier et al. | 324/61 R |
| 4,206,401 | 6/1980 | Meyer | 324/61 R |

Primary Examiner—Stanley T. Krawczewicz

[57] ABSTRACT

A device for measuring the relative position of two objects by variation of capacitance. The device comprises a capacitive detector of the differential type which has at least two first electrodes adapted to be mechanically connected to one of the objects and at least a second electrode adapted to be mechanically connected to the other object and forming with the first electrodes two capacitances which vary as a function of the relative position of the objects. These two capacitances are in a ratio which is only a function of this relative position. There is provided a circuit for determining the values of these capacitances. The measuring device further comprises switching means for selectively connecting said capacitances to the input of said value determining circuit so as to measure successively said capacitances and also the parasitic capacitance inherent in the measuring system.

16 Claims, 12 Drawing Figures

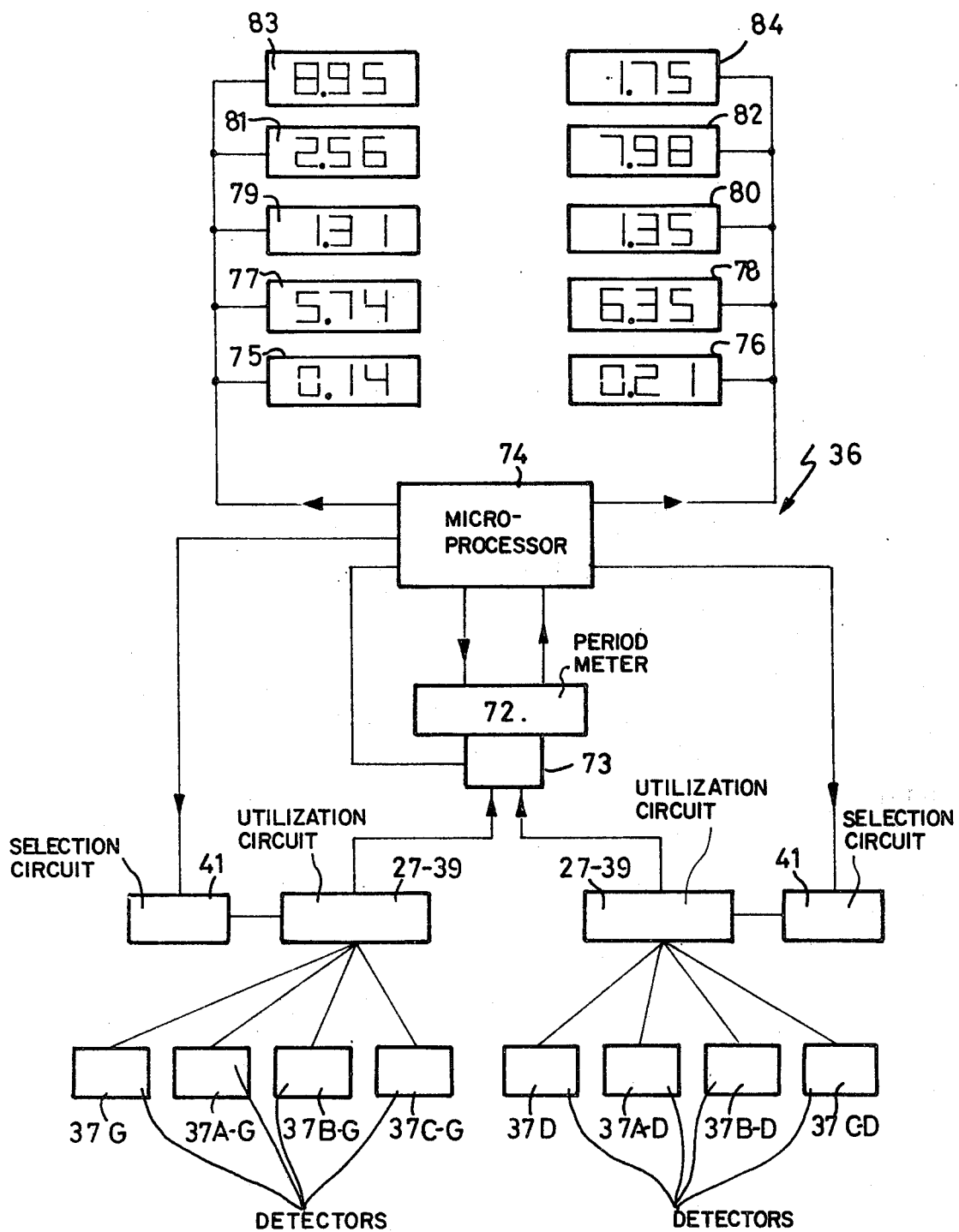

DEVICE FOR MEASURING THE RELATIVE POSITION OF TWO OBJECTS

The present invention relates to a device for measuring the relative position of two objects by variation of capacitance.

The measurement of the relative position of two objects, or of the evolution of this position with respect to time, has been in use for many years for extremely various applications. By forming a capacitance by means of elements which are good conductors of electricity and insulators having a very good dielectric property (for example air), it is possible to calculate the value of this capacitance by means of relatively simple laws and it may be rendered relatively stable as a function of various environmental parameters.

On the other hand, when it is desired to measure the capacitance, the problems becomes more delicate, in particular in respect of low values of capacitance. Consequently, when it concerns the measurement of the relative position of two objects and there must be used for this purpose small capacitive detectors (which is often desirable), the parasitic capacitive elements, due to the measuring system itself and to the connecting devices, may reach values which are of the order of magnitude of the values to be measured as a function of the relative position of the objects.

Although in the laboratory it is possible, provided complex and space-consuming equipment is used, to take into account these parasitic elements and to eliminate them from the measurement, it is not at present the same in industrial methods and in particular in the automobile field where it is often desirable to measure the relative position of two objects (garage inspection of the front and rear sets of wheels of an automobile vehicle for example). Indeed, in this case, the complex and space-consuming equipment of laboratories is obviously unsuitable.

An object of the invention is to provide a capacitive device for measuring the relative position, or the evolution of this position, with respect to time, of two objects which gives precise results even in a difficult environment by means of a simple and small apparatus.

According to the invention, there is provided a device comprising in combination, on one hand, a capacitive detector of the differential type comprising at least two first electrodes adapted to be mechanically connected to one of the objects, and at least a second electrode adapted to be mechanically connected to the other object and forming with the first electrodes two capacitances which vary as a function of the relative position of the objects, said two capacitances being in a ratio which is only a function of said relative position, and, on the other hand, a circuit for determining the values of said capacitances, wherein the device further comprises switching means which ensure the selective connection of said capacitances to the input of said value determining circuit so as to measure, in succession, said capacitances and also the parasitic capacitance inherent in the measuring system.

In this way it is possible, by a selective switching to measure in succession the different values of capacitance and to deduce therefrom by a simple calculation which may be performed by electronic circuits, the capacitances determining the relative position of the objects and excluding the influence of the parasitic capacitances which have an adverse effect on the accuracy of the measurements carried out.

Further features and advantages of the invention will be apparent from the ensuing description with reference to the accompanying drawings which are given solely by way of example and in which:

FIGS. 11 and 12 are diagrammatic views of a particular application of the measuring device according to the invention to the inspection of axles of an automobile vehicle.

Figure 1:
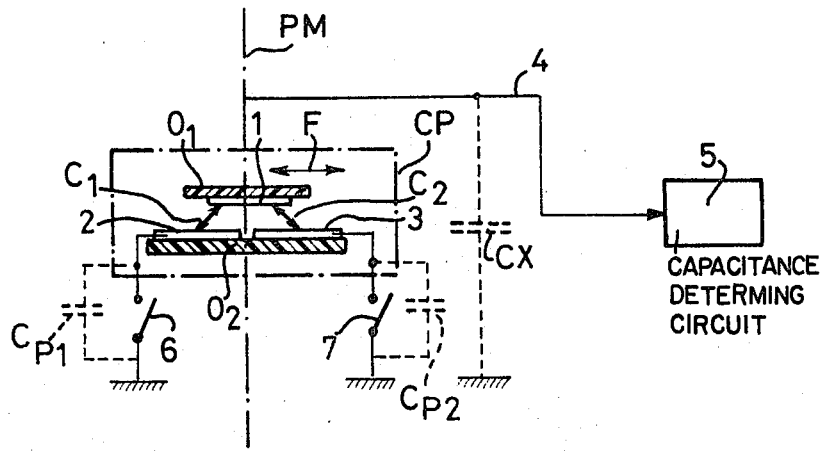
FIG. 1 is a very simplified diagram of a position measuring device according to the invention.

Reference will first be made to FIG. 1 which explains the basic principle of the invention. This FIG. 1 shows very diagrammatically two objects $O_1$ and $O_2$ which are capable of undergoing a relative movement in the direction of arrow F. Note that the objects $O_1$ and $O_2$ diagrammatically represented here are in fact assumed to be the fixed and moving elements of a capacitive position detector CP indicated in dot-dash lines, these elements being respectively mechanically connected to objects which may undergo this relative movement.

One of the objects $O_1$ is provided with an electrode 1, whereas the other object is provided with two electrodes 2 and 3 which are placed side-by-side in confronting relation to the electrode 1 and form therewith two capacitors $C_1$ and $C_2$ whose capacitances vary as a function of the relative position of the two objects $O_1$ and $O_2$ and whose ratio $C_1/C_2$ is only a function of this relative position. The electrode 1 is connected through a connection 4 to a capacitance determining circuit 5. The whole of this measuring system has, with respect to earth, a parasitic capacitance $C_x$ of which account must be taken when correctly determining the capacitances of the two capacitors $C_1$ and $C_2$. The electrodes 2 and 3 are of course insulated from each other.

By precisely measuring the capacitances of the capacitors $C_1$ and $C_2$, the relative position of the two objects $O_1$ and $O_2$ may be deduced therefrom. For example, in choosing the value of position O when the electrode 1 is placed symmetrically relative to a median plane PM of the position detector CP, a value may be given to each of the relative positions of the two objects by means of the formula:

$$P_{rel} = (C_1 - C_2)/(C_1 + C_2)$$

the extreme positions of the possible travel being then respectively +1 and −1. It is clear that, with these values of position, it is possible to deduce the evolution of the relative position of the two objects $O_1$ and $O_2$ and consequently their relative displacement.

On the other hand, if a value O is given to one of the extreme positions, we have the formula:

$$P_{rel} = C_1/(C_1 + C_2) \text{ or } C_2/(C_1 + C_2)$$

for finding any intermediate position between this value O and the value corresponding to the maximum possible travel (depending on whether the extreme position is at the right or at the left of the plane PM).

The difficulty in the precise measurement of the capacitances $C_1$ and $C_2$ of course resides in the presence of the parasitic capacitance $C_x$. According to the invention, this precise measurement may be effected by the successive determination of three values of capacitance. For this purpose, the device according to the invention comprises switching means, formed in the illustrated example by two switches 6 and 7 which are respectively connected between the electrodes 2 and 3 and earth. Assuming that the switches are perfect (i.e. have no parasitic capacitance of their own), the following may be selectively connected to the input of the capacitance determining circuit 5:

(1) the parasitic capacitance $C_x$ by the opening of the two switches 6 and 7,
(2) $C_1 + C_x$ by the opening of the switch 7,
(3) $C_2 + C_x$ by the opening of the switch 6.

With these values of capacitance, the capacitances $C_1$ and $C_2$ may be calculated by a simple subtraction of $C_x$.

This calculation neglects the effect of other parasitic capacitances resulting from parts of the electrodes which do not face each other, or from the presence of the support of the electrodes, etc.

This effect may be calculated by the association of the results obtained with the value of the capacitance $C_{tot}$ measured by closing the two switches 6 and 7. This parasitic capacitance, termed mutual capacitance $C_m$, may then be written:

$$C_m = \{(C_1 + C_x) + (C_2 C_x) - 2C_x\} - \{(C_{tot} + C_x) - C_x\}$$

simplifying:

$$C_m = C_1 + C_2 - C_{tot}$$

The effect of this capacitance $C_m$ varies from one detector to the other as a function of the dimensions and materials employed.

Taking into account the capacitance $C_m$, the value representing the relative position of the objects becomes (first case of the above figure):

$$P_{rel} = (C_1 + C_x) - (C_2 + C_x) - KC_m)/((C_1 + C_x) + (C_2 + C_x) - 2C_x - KC_m)$$

in which K is a constant pertaining to a given detector.

This it is clear that it is possible to obtain a measurement of the position or of the relative displacement of the objects $O_1$ and $O_2$ by means of a circuit, the principle of which is illustrated in FIG. 1, with the exclusion of the effect of the parasitic capacitances and by means of a succession of measurements controlled by the switches 6 and 7.

Figure 2:
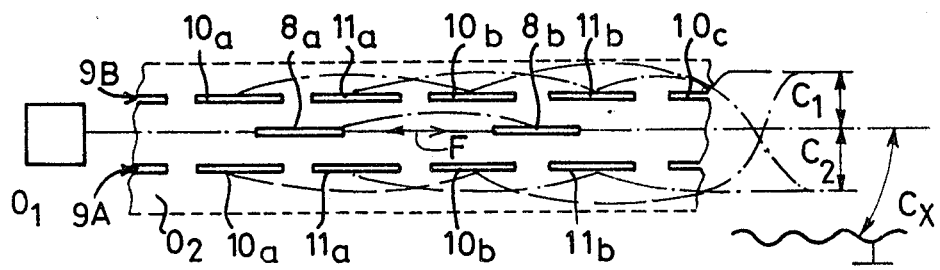
FIG. 2 is a diagrammatic representation of a multiple capacitive detector which may be employed in the invention.
Figure 3:
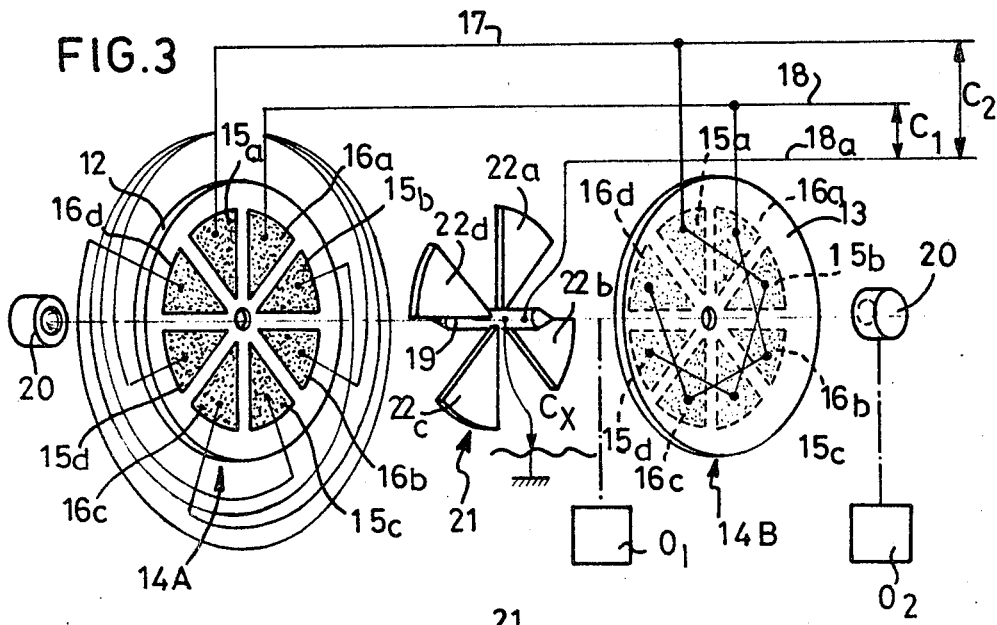
FIG. 3 is a diagrammatic exploded perspective view of an angular capacitive detector which may be employed for carrying out the invention.
Figure 4:
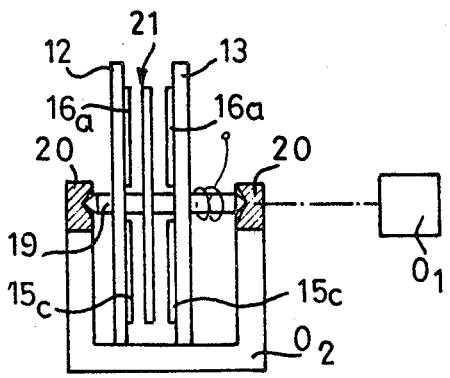
FIG. 4 is a side elevational view of the detector of FIG. 3 in its assembled state.

FIGS. 2 to 4 show by way of example two modifications of capacitive detectors which may be employed in the manner indicated hereinbefore.

In FIG. 2, the object $O_1$ is connected to move with a series of electrodes 8a, 8b . . . , whereas the object $O_2$ is mechanically connected to two groups 9a and 9b of electrodes 10a, 10b, . . . and 11a, 11b, . . . respectively, forming with the electrodes 8a, 8b, . . . basic capacitive cells such as that of FIG. 1 connected in parallel and together forming the capacitors $C_1$ and $C_2$. The groups of electrodes 9A and 9B are disposed on each side of the electrodes 8a and 8b. In this Figure, it concerns a capacitive detector for measuring linear displacements. In FIGS. 3 and 4, such a detector has been shown for angular displacements. This detector comprises first and second insulating discs 12 and 13 fixed to the object $O_2$ and having on their confronting faces respective circular groups 14A and 14B of electrodes 15a to 15b and 16a to 16b, the alternating electrodes of the two groups being together connected to a common conductor 17 and the other alternating electrodes of these groups being connected to a common conductor 18. The electrodes 15a to 15b and 16a to 16b have the shape of a sector of a circle and are insulated from each other on the discs 12 and 13. The latter are provided in their centres with an aperture through which extends a pin 19 which is received in bearings 20 rigid with the object $O_2$ for example. The pin 19 receives a star-shaped element 21 constituting electrodes 22a to 22d which respectively cooperate with adjacent pairs of electrodes 15a, 16a, 15b, 16b, . . . so as to constitute capacitors. The assembly having been arranged suitably in parallel, this detector forms the capacitances $C_1$ and $C_2$ between the conductors 17 and 18 and a conductor 18a which is electrically connected to the star-shaped element 21.

It will be understood that many modifications may be made in these detectors in respect of which it is possible to increase the number of electrodes (and therefore capacitances), change the mechanical configuration etc., in accordance with the envisaged applications and the nature of the objects $O_1$ and $O_2$. As a rule, the greater the number of electrodes per unit length (or per unit angle) the smaller the extent of the measurement of displacement and the greater the effect of a displacement on the result of the measurement.

The circuit just described has the following advantages:

(a) the circuit is differential, i.e. insensitive to variations in parameters such as the dielectric coefficient of the insulators, the parasitic capacitance, the sensitivity of the capacitance determining circuit, etc.;

(b) in the cse of a double circuit (FIGS. 2, 3 and 4), the sensitivity to a defect in the relative position in a direction perpendicular to the planes of the electrodes (defect of parallelism) is of low value and is in a relatively large range; for example, assuming that there is a defect in the parallelism resulting in a variation in the distance between the electrodes ranging from 1 to 3 (which is an excessively large value), the error in the measured capacitances is only about 8%;

(c) the circuit permits the measurement of parasitic terms of the capacitances $(C_x + C_m)$ and consequently the correction of their effect in accordance with their aging;

(d) apart from their own necessary rigidity, there is no requirement of mechanical strength of the component parts of the detector and it is consequently possible to construct light detectors having a low inertia;

(e) there is no requirement of a force to be transmitted and no friction and no effect of exterior forces on the detector, so that the circuit requires only a very low control force for detecting a displacement;

(f) the circuit is only very slightly sensitive to disturbing elements of magnetic and electric origin and to most physical disturbances.

Figure 5:
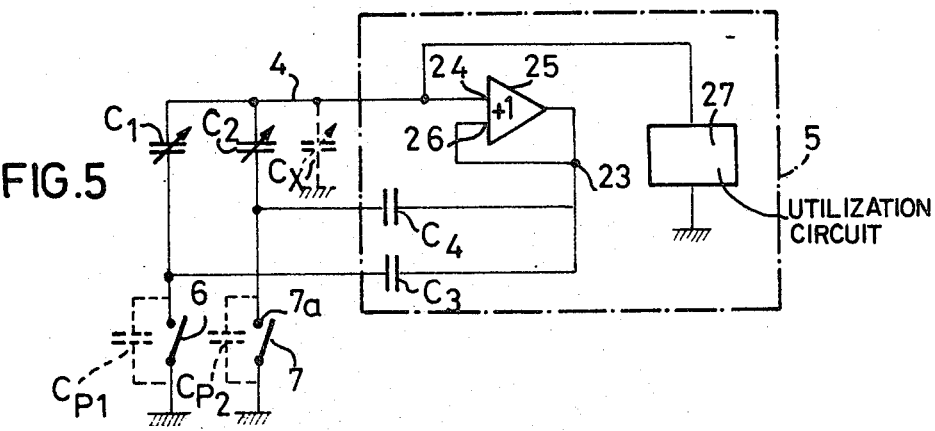
FIG. 5 is a simplified diagram of a more elaborate embodiment of the measuring device according to the invention.

In the description of the circuit of FIG. 1, it has been assumed that the switches 6 and 7 do not have their own capacitance. In practice, this is of course not the case. FIG. 5 shows the diagram of a circuit for eliminating the effect of the parasitic capacitances $C_{p1}$ and $C_{p2}$ of the switches 6 and 7. In this embodiment, the electrodes of the capacititors $C_1$ and $C_2$ which are respectively connected to the switches 6 and 7 are also connected to the capacitance determining circuit 5, namely through capacitors $C_3$ and $C_4$ whose opposed terminals are connected to a junction point 23. Further, the conductor 4 which connects the capacitors $C_1$ and $C_2$ to the capacitance determining circuit 5 is connected to the first input 24 of a follower amplifier 25 having unit gain whose other input 26 is connected to the junction 23. The conductor 4 is also connected to a utilization circuit 27 for producing the result of the measurement.

Assuming that the capacitance of the capacitor $C_1$ is measured first, the switch 6 is closed and the switch 7 remains open. Without any special precaution, under these conditions, the sum of the capacitances $C_1$ and $C_x$ and the parasitic capacitance $C_{p2}$ of the switch 7 would be measured. With the circuit just described, the effect of this capacitance $C_{p2}$ is eliminated since the voltage developed at the output of the amplifier 25 (which is equal to the voltage of the conductor 4) is transferred to the electrode of the capacitor $C_2$ which is connected to the fixed terminal 7a of the switch 7. By choosing for the capacitor $C_4$ a value which is high relative to the capacitance $C_{p2}$, the effect of the latter becomes negligible owing to the favorable ratio of the voltage divider formed by the capacitors $C_4$ and $C_{p2}$. Of course the same reasoning is valid for the case where the capacitor $C_2$ is measured and where the switch 6 remains open. In the case of the measurement of $C_x$, the effect of the capacitances $C_{p1}$ and $C_{p2}$ is eliminated owing to the simultaneous action of the two capacitors $C_3$ and $C_4$. Assuming that the capacitances $C_{p1}$ and $C_{p2}$ are 10 pF for example, it is advantageous to choose for the capacitors $C_3$ and $C_4$ a value of 10,000 pF at the minimum for example. Moreover, the value must be sufficiently low to enable the amplifier 25 to deliver the current which passes through the capacitors $C_3$ and/or $C_4$ when the corresponding switches close. In the case where the switches are formed by elements having a high resistance of their own (for example swiches having semiconductors), account must also be taken of the effect of the current passing through the capacitor $C_3$ and/or $C_4$ and passing through this resistance.

Figure 6:
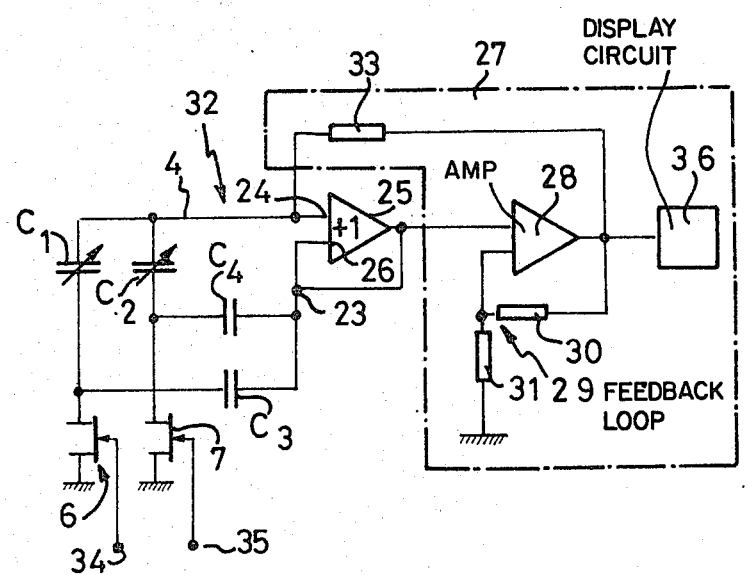
FIG. 6 is a diagram of a measuring device according to the invention and its utilization circuit.

FIG. 6 shows a circuit similar to that of FIG. 5 but in which the utilization circuit 27 is shown in more detail.

Note that in order to determine the capacitances involved in the device according to the invention, any conventional measuring apparatus of this type may be employed. However, it is preferable to employ the circuit 27 of FIG. 6. This circuit constitutes a part of an oscillator circuit and includes a high-gain amplifier 28. This amplifier has a feed-back loop 29 of the aperiodic type formed by a resistor 30 connecting its output to a first of its inputs and another resistor 31 connecting this input to earth. The amplifier 28 further comprises a negative feed-back loop 32 formed by an integrating circuit, the time constant of this integrating circuit determining the period of the oscillation produced. The resistive element of the integrating circuit is a resistor 33 which interconnects the conductor 4 and the output of the amplifier 28 and the capacitive element is formed selectively by the capacitors $C_1$ to $C_4$.

Consequently, there is produced at the output of the amplifier 28 a periodic voltage whose period is proportional to the measured instantaneous capacitance (as a function of the state of the switches 6 and 7 which are here shown to be switching transistors controlled on the terminals 34, 35).

The variable periodic signal is then sent to a processing and display circuit 36.

The circuit just described has several advantages. Indeed, it has high linearity and is very cheap. Moreover, no precision element is required and the useful signal appears in the form of a variable period and can be used in the digital manner for example by means of conventional counting circuits.

Figure 7:
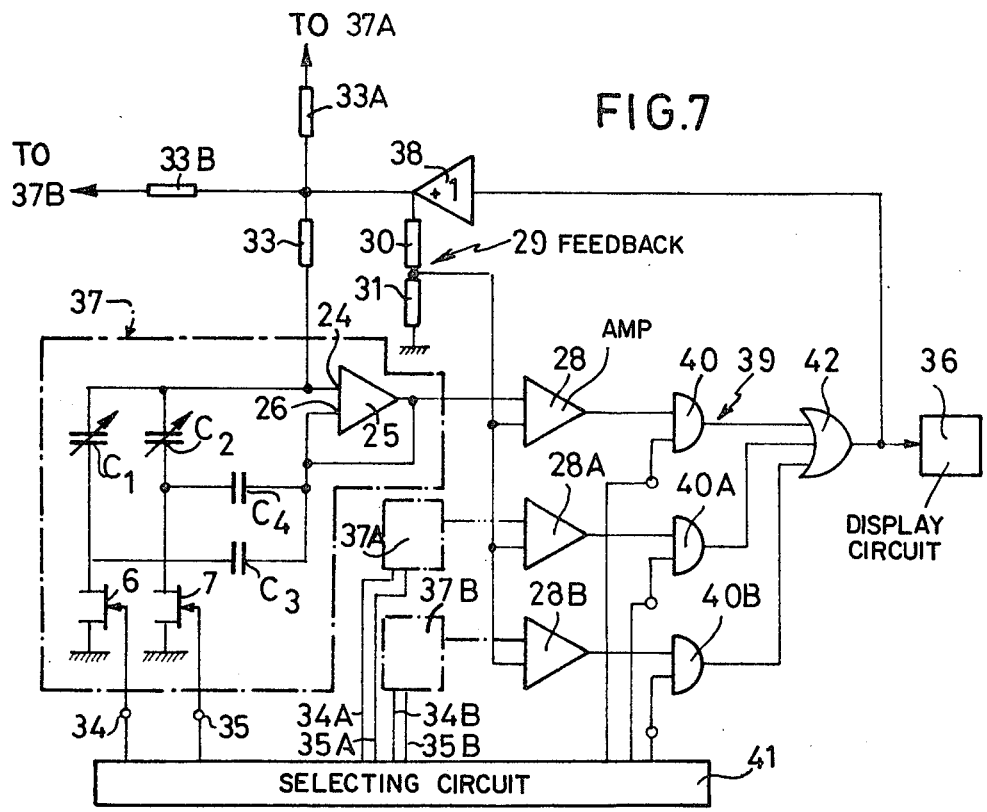
FIG. 7 is a diagram of a measuring device according to the invention comprising a plurality capacitive detectors which may be employed selectively with a common capacitance determining circuit.

FIG. 7 shows a circuit derived from that of FIG. 6 in which the signals of a plurality of capacitive detectors may be utilized selectively. In this Figure, 37, 37A and 37B designate three capacitive detectors and their associated circuits each comprising the capacitors $C_1$ to $C_4$, the amplifier 25 and the switches 6 and 7. The outputs of the units 37, 37A and 37B are respectively connected to amplifiers 28, 28A and 28B similar to the amplifier 28 of FIG. 6 and associated with a common feed-back circuit comprising the resistors 30 and 31. The negative feed-back circuits 32 of the amplifiers 28A and 28B comprise resistors 33, 33A and 33B respectively and the corresponding amplifiers and capacitors of the units 37, 37A and 37B. Also provided is a unit gain amplifier 38 actng as an impedance adaptor between the junction of the resistors 33, 33A and 33B and the output of a selection logic circuit 39 which selectively sends the signals from the amplifiers 28, 28A and 28B to the processing and display circuit 36.

The selecting logic circuit comprises AND gates 40, 40A and 40B opened by a control and selecting circuit 41 also connected to the control electrodes of the switches 6 and 7 of each of the units 37, 37A and 37B so as to control them in synchronism with the opening of the AND gates 40, 40A and 40B.

The outputs of the AND gates are connected to a common OR gate 42 which transmits the signal to the circuits 36.

Figure 8:
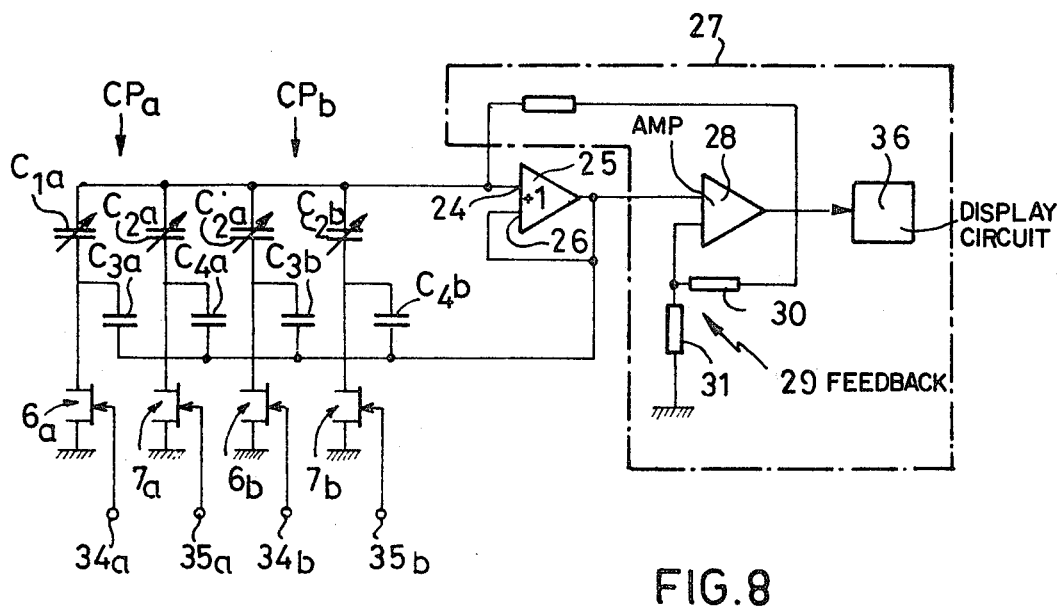
FIG. 8 shows the modification of the measuring device with a plurality of capacitive detectors employed simultaneously.

FIG. 8 shows a measuring device according to the invention in which a plurality of capacitive detectors such as that (CP) of FIG. 1 are connected together and connected to a common utilization circuit 27 of the type shown in FIG. 6.

Thus the detector $CP_a$ comprises the capacitors $C_{1a}$, $C_{2a}$, $C_{3a}$ and $C_{4a}$ and the switches $6_a$ and $7_a$ respectively controlled through the terminals $34_a$ and $35_a$, like references being employed for the detector $CP_b$.

On the other hand, the amplifier 25 is common to the two detectors $CP_a$ and $CP_b$. By a suitable control of the switches, it is possible to obtain in this device a measurement of the relative position of two pairs of objects by using only a single utilization circuit 27.

The device of FIG. 8 has the considerable advantage of employing the same utilization circuit 27 without any modification for all the capacitances of the detectors (useful and parasitic). The values obtained with this single circuit are therefore coherent between one another and very reliable differential measurements may be obtained.

Figure 9:
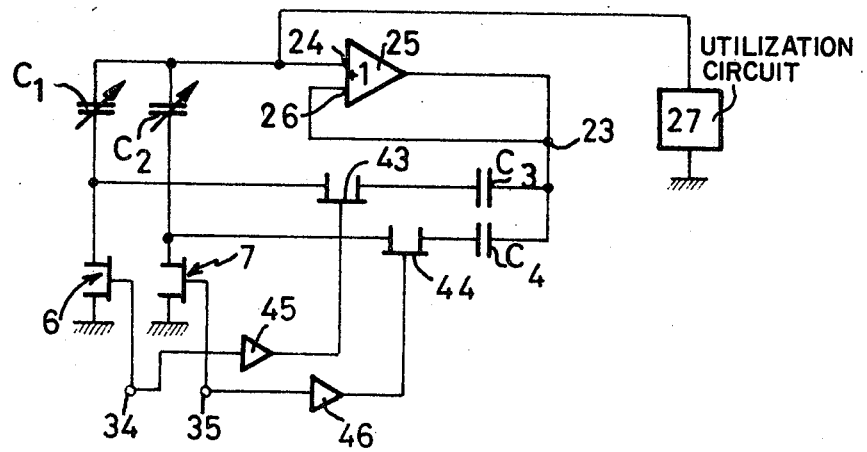
FIG. 9 shows another modification of the measuring device in which the means for compensating for parasitic capacitances are improved.

FIG. 9 shows a modification of FIG. 5 in which it is possible to avoid the necessary compromise in the choice of the values of the capacitors $C_3$ and $C_4$. In this case, each capacitor $C_3$ or $C_4$ is connected in series with a switch 43 or 44 respectively (preferably of the semiconductor type) whose control electrodes are connected to the corresponding terminals 34 and 35 through inverters 45 and 46. With this circuit, the capacitors $C_3$ and $C_4$ are therefore put out of circuit when the corresponding switch 6 or 7 is closed. Thus the choice of the capacitors $C_3$ and $C_4$ is no longer limited toward the high value of capacitance.

Figure 10:
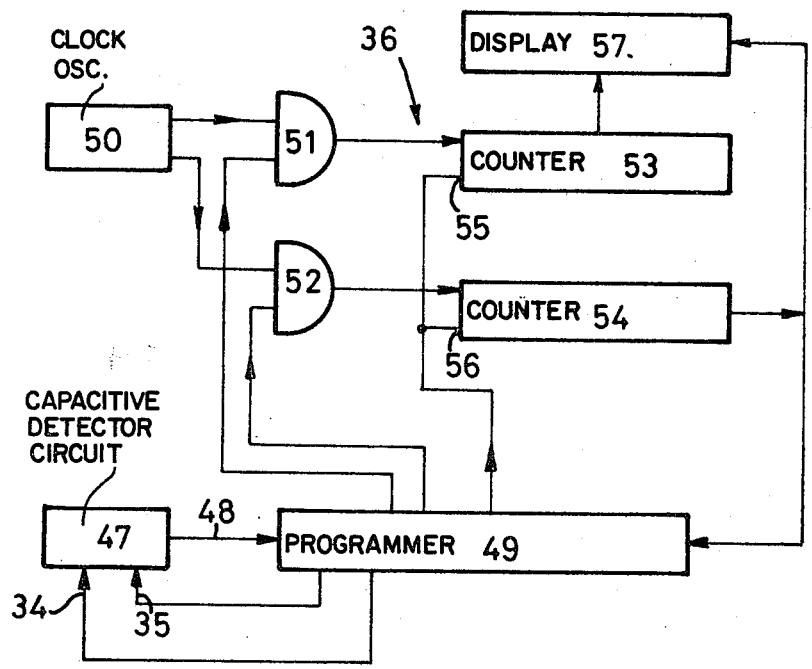
FIG. 10 is a simplified diagram of a measuring device according to the invention, the circuit for utilizing the measurement being shown in more detail.

FIG. 10 shows a possible embodiment of the processing and display circuit 36 (FIGS. 6 to 8). In this Figure, a rectangle 47 represents a unit comprising a capacitive detector and its associated circuit which may be for example that of FIG. 6. The output of the amplifier 28 is shown at 48. The processing and display circuit comprises a logic control or programming device 49 which is adapted to control all the other components of the circuit 36 and to coordinate their operation. It also comprises switches 6 and 7 of the unit 47 and, for this purpose, it is connected to the terminals 34 and 35 of this unit.

The processing and display circuit 36 also comprises a clock oscillator 50 having a relatively high frequency distinctly higher than those which may be generated in the unit 47 of the capacitive detector.

The clock signal from the oscillator 50 is applied simultaneously to first inputs of two AND gates 51 and 52 the opening of which is controlled by the programming device 49 which is connected for this purpose to their second input.

The outputs of the AND gates 51 and 52 are respectively connected to the counting inputs of two counters 53 and 54 which are also connected to the programming device 49 through authorization inputs 55 and 56. The counter 53 is connected to a display device 57 which is also connected to this programming device.

Assuming that it is desired to obtain on the display device 57 a value as a percentage of a given relative displacement undergone by two objects $O_1$ and $O_2$ relative to the full travel, from one end of this travel, the operation of the circuit of FIG. 10 is the following:

In the course of the operation, all of the operations are controlled by the programmer 49.

Consequently, the parasitic capacitance $C_x$ is first measured by the opening of the two switches 6 and 7 of the detector. Consequently a signal appears in the conductor 48 whose period is a function of the value of the capacitance $C_x$.

The oscillator 50 produces its pulses and the gates 51 and 52 are opened and the counters 53 and 54 are each made to count the value of $C_x$.

The measurement of the capacitance $C_1 + C_x$ is then effected by means of the switches 6 and 7 and the counters 53 and 54 are made to store this value by an appropriate actuation of the gates 51 and 52, their contents being therefore merely the value of the capacitance $C_1$.

Then, the capacitance $C_x$ is again measured and the value is subtracted only in the counter 54 which then stores $C_1 - C_x$ and opens only the AND gate 52.

Thereafter, the programmer initiates the measurement of the capacitance $C_2 + C_x$ whose value in clock pulses is also only stored in the counter 54.

At the end of this sequence, the counter 53 consequently only contains the value of $C_1$ and the counter 54 the value of $C_1 + C_2$.

The sequence is then repeated several times until a predetermined value is obtained in the counter 54. The number of sequences must be sufficiently large so that the influence of the error on a sequence be negligible in the final result.

As a result of this repetition of sequences, the counter 53 in fact contains the value of $C_1$ in the form of the scale of 100% so that it can consequently be introduced in the display device 57.

Figure 11:
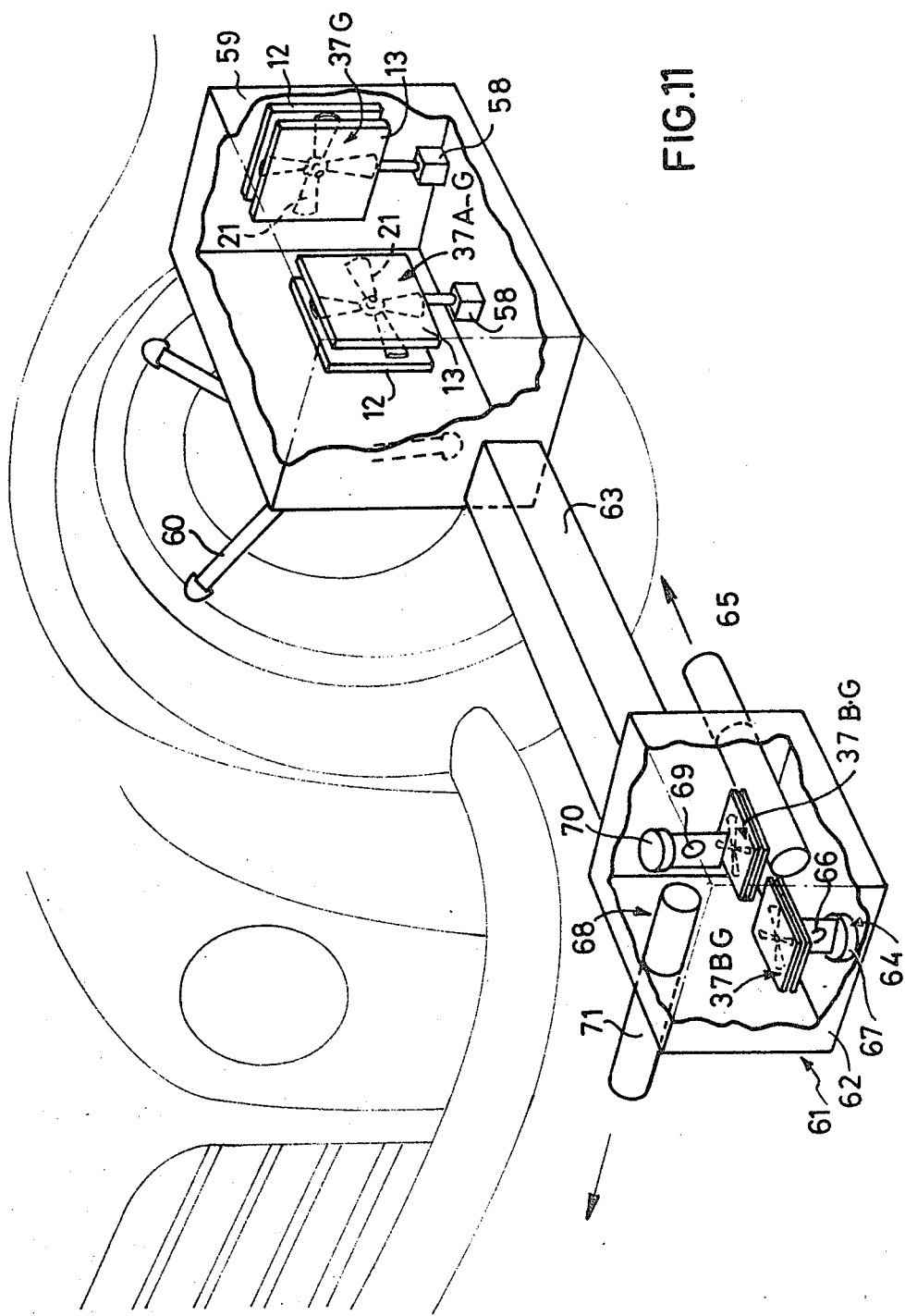

FIGS. 11 and 12 show an example of a possible application of the measuring device according to the invention to which the invention is in no way limited.

It concerns in the chosen example the inspection of the axles of an automobile vehicle and more precisely the inspection of the parallelism and the warping of the wheels of each axle and the angles of castor, pivot and camber of these wheels, these measurements being on principle well known in the automobile art.

Within the framework of such an inspection, the measuring device according to the invention has for function to give the indications as a value of angle or other measurement of the aforementioned parameters.

The circuit employed in this example is that shown in FIG. 7. FIG. 12 diagrammatically repeats this Figure with the same references completed by the letter D or G depending on whether it concerns the right or left side of the vehicle being inspected. Note that in FIG. 11 only the left side is shown. In the illustrated case, the objects $O_1$ and $O_2$ to which the two parts of the capacitive detectors 37G, 37A-G, 37D and 37A-D are connected are respectively constituted by the wheel being inspected and by a pendulum 58 (FIG. 11), the embodiment of the capacitive detectors of FIG. 11 being that shown in FIGS. 3 and 4, it being understood that the pendulum is connected to the electrode 21. The latter consequently constantly maintains a fixed position relative to the vertical whereas the other electrodes are liable to assume given angular positions as a function of angular parameters to be measured on the wheel. In the known way, the angular detectors 37G and 37A-G are placed in a case 59 which is adapted to be temporarily fixed to the wheel to be inspected by means of a support 60. The detectors 37G and 37A-G are disposed in such manner as to measure in vertical planes which make an angle of 90° therebetween. In other words, the axes of their electrode 21 make an angle of 90° therebetween.

In order to obtain a geometric coordination, on one hand, between the rear axle and the front axle of a vehicle and, on the other hand, between the left and right wheels, the device of FIGS. 11 and 12 further comprises a light projecting device 61 a part of which is disposed in a case 62 connected to the case 59 by an arm 63 whereas the other part, which is symmetrical to the first-mentioned part (not shown in FIG. 11), is connected to the right case 59 (also not shown in the drawing).

Each case 62 has a first light projecting system 64 which returns a beam of light rearwardly to an optical system 65, this beam coming from a movable light source 66 mounted on the output shaft of a servo motor 67, the angular position of this shaft relative to the case 62 being detected by the capacitive detector 37B-G.

This optical system cooperates with a photo electric index (not shown) which is fixed on the corresponding rear wheel so as to constitute with this index and the detector 37B-G a feedback loop which tends to maintain the beam of light on a part on which it impinges on said index.

Each case 62 also contains a second optical system 68 which corresponds with the corresponding optical system of the symmetrical case placed on the other side of the vehicle. The beam of light of this system 68 is produced in a light source 69 which is movably mounted on the output shaft of a servo motor 70, the angular position of this shaft relative to the case 62 being detected by the capacitive detector 37B-G. The beam emerging from the light source 69 passes through an optical system 71 and is sent to the homologous system placed on the other side of the vehicle and comprising a movable photo-electric detector instead of a light source. With this arrangement, it is possible to obtain a geometric coupling of the right and left sides of the installation.

FIG. 12 shows that the measurement signals produced by the two groups of four capacitive detectors are transmitted through respective common oscillators 27–39 to a period meter 72 which is common to the two groups, after a right-left selection in a selecting logic circuit 73.

The operations are all controlled by a microprocessor 74 which also effects the aforementioned calculation for the appropriate selective transfer of the results of the measurements to display devices which are adapted to display, for the right and the left sides, the values of the warping of the wheel (75, 76), the pivot angle (77, 78), the castor angle (79, 80), the camber angle (81, 82) and the parallelism (83, 84), for example.

Having now described my invention what I claim as new and desire to secure by Letters Patent is:

1. A device for measuring the relative position of two objects by variation of capacitance, said device comprising in combination:
    a capacitive detector of the differential type comprising at least two first electrodes for mechanically connecting to one of said objects, and at least one second electrode for mechanically connecting to the other of said objects and forming with the first electrodes two variable capacitances which vary as a function of the relative position of the objects, said two capacitances being in a ratio which is only a function of said relative position;
    a circuit for determining the values of said capacitances;
    switching means selectively connecting said capacitances to an input of said value determining circuit for successively measuring said capacitances and also the parasitic capacitance inherent in the measuring device.

2. A device as claimed in claim 1, wherein said switching means are switches respectively connected in series with said capacitances, said capacitances being connected between said switches and a common input of said capacitance determining circuit.

3. A device as claimed in claim 2, wherein said capacitance determining circuit comprises for the purpose of neutralizing the effect of parasitic capacitances pertaining to said switches, a pair of auxiliary capacitors respectively connected to junctions between the switches and said capacitances and an output of a unit gain amplifier which has an input connected to an input of a circuit utilizing the capacitive measurements.

4. A device as claimed in claim 3, comprising second switches with which second switches said auxiliary capacitors are respectively connected in series, and means actuating said second switches in synchronism with the switches of said capacitances but in the reverse manner to the last-mentioned switches.

5. A device as claimed in claim 1, wherein said switching means comprise semiconductor components.

6. A device as claimed in claim 3, wherein said utilization circuit comprises a high gain amplifier loop connected to its input through said capacitive detector so as to form an oscillator circuit, and said oscillator circuit produces a measurement signal having a period which varies as a function of the measured capacitance, and there is provided a processing and display circuit, and said oscillator circuit is connected to the processing and display circuit so as to apply thereto said measurement signal.

7. A device as claimed in claim 6, comprising a plurality of capacitive detectors each of which is associated with a unit gain amplifier but connected in common to a common high gain amplifier, a selecting and control circuit being provided for ensuring the selective transmission of the values measured by said detectors to a common processing and display circuit.

8. A device as claimed in claim 6, comprising a plurality of capacitive detectors connected in common to one and the same unit gain amplifier and associated with one and the same high gain amplifier.

9. A device as claimed in any one of the claims 6 to 8, wherein said processing and display circuit comprises in combination a clock oscillator, two counters and a logic circuit for the selective application of pulses produced by the oscillator to said counters as a function of the length of period representing said measured capacitances, and said logic circuit is adapted to cause said counters to count up in the course of the measurement of the sum of said capacitances and the parasitic capacitance and to cause said counters to count down in the course of the measurement of said parasitic capacitance alone, one of the counters being connected to a display device.

10. A device as claimed in any one of the claims 6 to 8, wherein said processing and display circuit comprises a microprocessor.

11. A device as claimed in any one of the claims 1 to 6, wherein said capacitive detector comprises at least two groups of first electrodes, a group of a plurality of second electrodes respectively associated with two adjacent pairs of first electrodes, the groups of first electrodes being placed on each side of the second electrodes and being relatively movable in adjacent planes.

12. A device as claimed in claim 11, wherein said groups of electrodes are respectively aligned and are relatively movable in a rectilinear direction.

13. A device as claimed in claim 11, wherein said groups of electrodes are placed respectively on circles and are relatively movable in an angular direction about a common axis passing through centres of said circles.

14. A device as claimed in claim 11, wherein a member forming a pendulum constitutes one of the objects subjected to the relative movement.

15. A device as claimed in claim 9 in combination with an installation for measuring the geometry of the axles of an automobile vehicle.

16. A device as claimed in claim 15, wherein a member forming a pendulum constitutes one of the objects subjected to the relative movement.

* * * * *